(12) United States Patent
Vargantwar et al.

(10) Patent No.: US 8,588,695 B1
(45) Date of Patent: Nov. 19, 2013

(54) DATA TRANSFER RATE MODIFICATION IN A WIRELESS COMMUNICATION SYSTEM

(75) Inventors: Sachin R. Vargantwar, Overland Park, KS (US); Manoj Shetty, Overland Park, KS (US); Bhagwan Singh Khanka, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 862 days.

(21) Appl. No.: 12/776,487

(22) Filed: May 10, 2010

(51) Int. Cl.
*H04B 1/00* (2006.01)
*H04B 15/00* (2006.01)

(52) U.S. Cl.
USPC ....................................................... 455/63.1

(58) Field of Classification Search
USPC ............... 455/63.1, 67.13, 570, 114.2, 278.1, 455/283, 296
See application file for complete search history.

(56) References Cited

U.S. PATENT DOCUMENTS

| | | |
|---|---|---|
| 6,725,053 B2 | 4/2004 | Rosen et al. |
| 6,748,247 B1 | 6/2004 | Ramakrishnan et al. |
| 7,054,275 B2 | 5/2006 | Kim et al. |
| 7,580,366 B2 | 8/2009 | Kim et al. |
| 7,636,322 B1 | 12/2009 | Gandhi et al. |
| 2002/0015388 A1 | 2/2002 | Kim et al. |
| 2002/0173326 A1 | 11/2002 | Rosen et al. |
| 2004/0162031 A1 | 8/2004 | Athalye |
| 2006/0146876 A1 | 7/2006 | Kim et al. |
| 2009/0052322 A1 | 2/2009 | Simonsson et al. |

*Primary Examiner* — Eugene Yun

(57) ABSTRACT

Embodiments disclosed herein provide systems and methods for modifying the data transfer rate of wireless communications transferred by a wireless device. In a particular embodiment, a method comprises exchanging wireless communications between a wireless device and an access node on a wireless communication network. The method further includes determining a reverse noise ratio for the access node. Additionally, the method includes generating a message indicating the reverse noise ratio and transferring the message to the wireless device. The method further comprises receiving the message in the wireless device and modifying a data transfer rate of the wireless communications from the wireless device based on the reverse noise ratio indicated by the message.

20 Claims, 8 Drawing Sheets

DATA TRANSFER RATE MODIFICATION IN A WIRELESS COMMUNICATION SYSTEM

TECHNICAL BACKGROUND

Wireless communication devices, such as cellular phones, communicate with other devices and systems using wireless communication networks. Wireless networks communicate with wireless devices by way of wireless access nodes, such as base stations. Wireless devices and access nodes use various wireless protocols to exchange voice and data communications. The wireless protocols use carrier frequencies in the radio frequency (RF) bands of the electromagnetic spectrum to carry communications. Communications are modulated using the appropriate wireless protocol in order to transfer the communications wirelessly to an access node capable of demodulating the received communications.

RF communications, such as those described above between a wireless device and an access node, are susceptible to electromagnetic interference. Electromagnetic interference is commonly referred to as noise and is generally any electromagnetic radiation other than the intended wireless signal from the wireless device or the access node. Noise may be caused by natural phenomena but may also be caused by wireless transmissions made by other wireless devices, including other wireless devices communicating with the same access node.

As the separation between noise power levels and that of the data communication signal transferred from the wireless device, the data information in the signal may become harder to interpret. If the access node incorrectly interprets data information or fails to receive at least part of the information all together, then the wireless device may need to resend the data. Higher data transfer rates may be more susceptible to issues stemming from higher noise levels and lowering the data transfer rate may allow for better reception of the data information at the access node.

OVERVIEW

Embodiments disclosed herein provide systems and methods for modifying the data transfer rate of wireless communications transferred by a wireless device. In a particular embodiment, a method comprises exchanging wireless communications between a wireless device and an access node on a wireless communication network. The method further includes determining a reverse noise ratio for the access node. Additionally, the method includes generating a message indicating the reverse noise ratio and transferring the message to the wireless device. The method further comprises receiving the message in the wireless device and modifying a data transfer rate of the wireless communications from the wireless device based on the reverse noise ratio indicated by the message.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
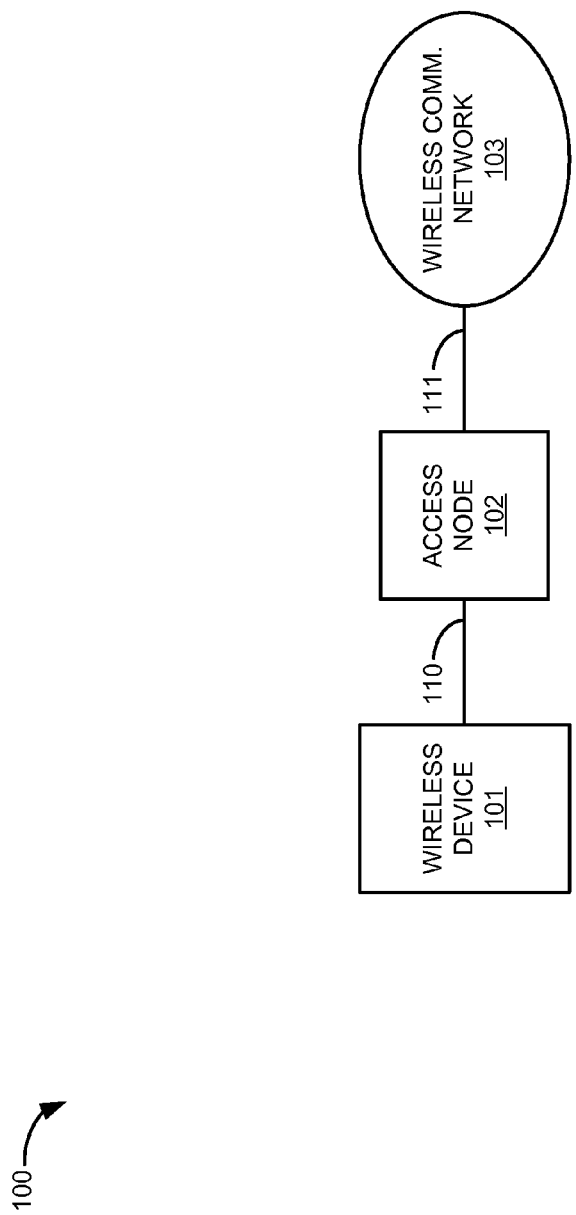
FIG. 1 illustrates a wireless communication system.

FIG. 1 illustrates wireless communication system 100. Wireless communication system 100 includes wireless communication device 101, wireless access node 102, and wireless communication network 103. Wireless communication device 101 and wireless access node 102 communicate over wireless link 110. Wireless access node 102 and wireless network 103 communicate over communication link 111.

In operation, wireless device 101 communicates with other system and devices over wireless network 103 via base station 102. Data communications between wireless device 101 and base station 102 are modulated and transferred over wireless link 110. The rate at which data communications are transferred is commonly called a bit rate. A bit rate is the number of data bits transferred per period of time, usually represented in bits per second. With higher bit rates comes higher transmission power needed to transfer the higher bit rates. Additionally, higher bit rates are more susceptible to interference from noise and other conditions causing higher potential for lost or misinterpreted bits at the receiving end of the communications. The transmitting device may resend the lost or misinterpreted bits. Lowering the bit rate helps to mitigate the number of lost or misinterpreted bits by reducing the number of bits per second, thereby providing a longer time period for each bit when transferred over a wireless link and interpreted by the receiving system.

Figure 2:
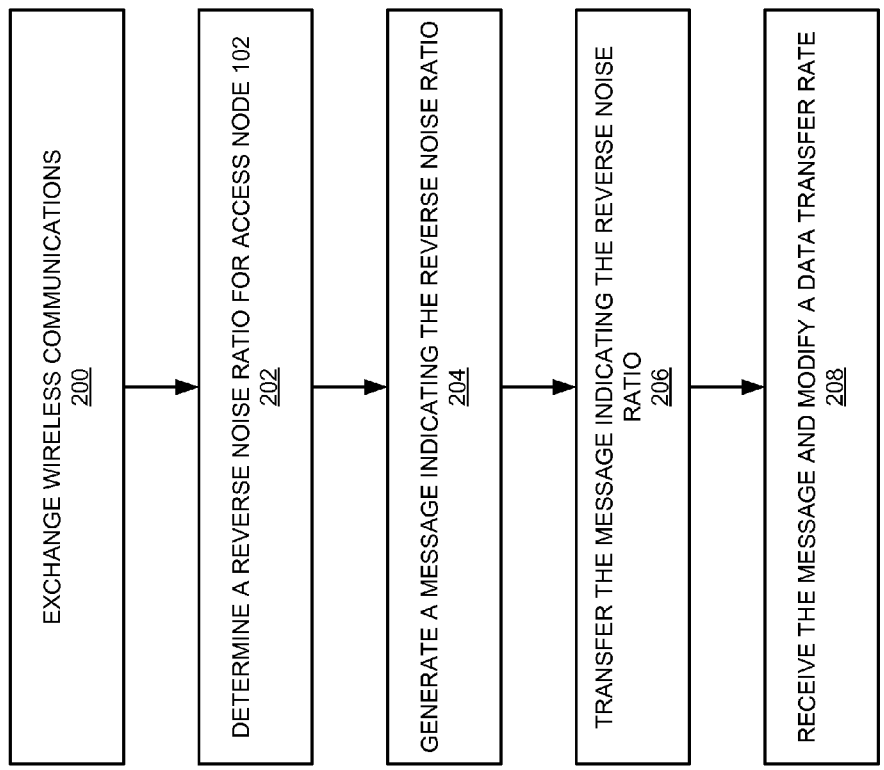
FIG. 2 illustrates the operation of a wireless communication system.

FIG. 2 illustrates the operation of wireless communication system 100. Wireless device 101 exchanges wireless communications with access node 102 on wireless network 103 (step 200). The data communications are being transferred by wireless device 101 at a first data transfer rate. The first data transfer rate may be a bit rate, byte rate, packet rate, or may be any other way of measuring data transfer rates. The first data transfer rate may also be the data transfer rate that access node 102 uses to transfer communications to wireless device 101. The first data transfer rate may be a default rate, a rate assigned as part of a prior rate modification, or any other way that wireless device 101 may determine or be assigned a data transfer rate. The communications may be user communications or any other type of data communications.

A reverse noise ratio (RNR) is determined for access node 102 (step 202). The RNR is a signal to noise ratio between power level of the wireless communication signal transferred from wireless device 101 and power level of the noise (electromagnetic interference) that access node 102 also receives. Higher RNRs correspond to higher signal power levels in relation to noise power levels. Lower RNRs correspond to lower signal power levels in relation to noise power levels. The noise may be general background noise, transmissions from other wireless devices, or any other type of electromagnetic noise that competes with the signal from wireless device 101. Typically, a low RNR indicates that the signal is more likely to be lost in noise. Access node 102 may determine the RNR itself, such as by a control system within access node 102, or the RNR may be determined by a system elsewhere on wireless network 103.

After the RNR is determined, a message indicating the RNR is generated (step 204) and transferred to wireless device 101 (step 206). The message may be a control message, a text message, or any other type of message that can be transferred to wireless device 101. Wireless device 101 receives the message and modifies the data transfer rate of the wireless communications based on the RNR indicated by the message (step 208). Wireless device 101 may modify the data transfer rate by reducing the rate if the RNR is low to allow for better reception of data at access node 102 and less lost packets that need to be resent. Additionally, wireless device 101 may modify the data transfer rate by increasing the data transfer rate if the RNR is high to allow for faster transference of data or may determine that no transfer rate modification is necessary.

In some embodiments, wireless device 101 may also determine a rate at which wireless device 101 is having to resend data to access node 102. The data may need to be resent dues to errors in the transmission or reception of the data, such as lost or misinterpreted data. Wireless device 101 may then modify the data transfer rate of wireless device 101 using both the data resend rate and the RNR.

In further embodiments, wireless device 101 sets the state of a reverse activity bit (RAB) based on the data resend rate and the RNR. Then, wireless device 101 modifies the data transfer rate based on the state of the RAB.

In some embodiments, access node 102 may continually, or periodically, transfer the current RNR to wireless device 101. Wireless device 101 may then continually, or periodically, determine the current data resend rate to further modify the data transfer rate of wireless device 101. Additionally, the process may continue as wireless device 101 moves to communicating with access nodes other than access node 102. Another access node will transfer the RNR to wireless device 101 and the process will continue as it did when wireless device 101 was connected to access node 102.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Wireless link 110 uses the air or space as the transport media. Wireless link 110 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 111 uses metal, glass, air, space, or some other material as the transport media. Communication link 111 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 111 could be a direct link or may include intermediate networks, systems, or devices.

Figure 3:
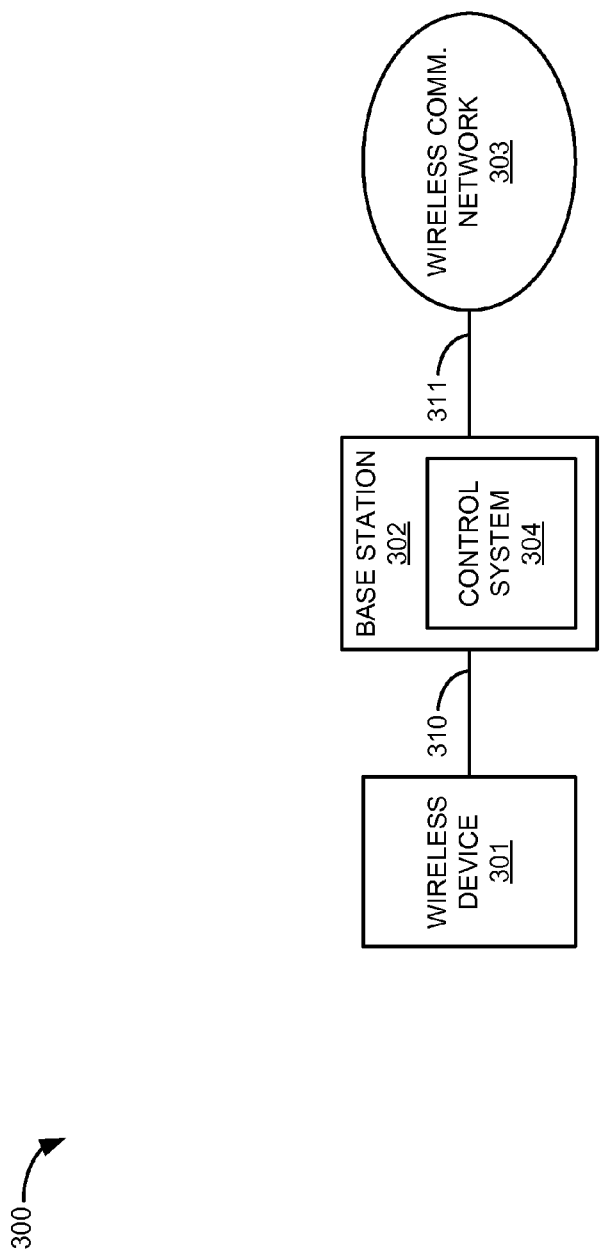
FIG. 3 illustrates a wireless communication system.

FIG. 3 illustrates wireless communication system 300. Wireless communication system 300 includes wireless communication device 301, base station 304, wireless communication network 303, and control system 304. Wireless device 301 and base station 302 communicate over wireless link 310. Base station 302 and wireless network 303 communicate over link 311.

Communication control system 304 comprises a computer system and communication interface. Communication control system 304 may also include other components such a router, server, data storage system, and power supply. Communication control system 304 may reside in a single device or may be distributed across multiple devices. Communication control system 304 is shown internally to base station 302, but system 304 could be an independent system or integrated into another system of wireless network 303.

Figure 4:
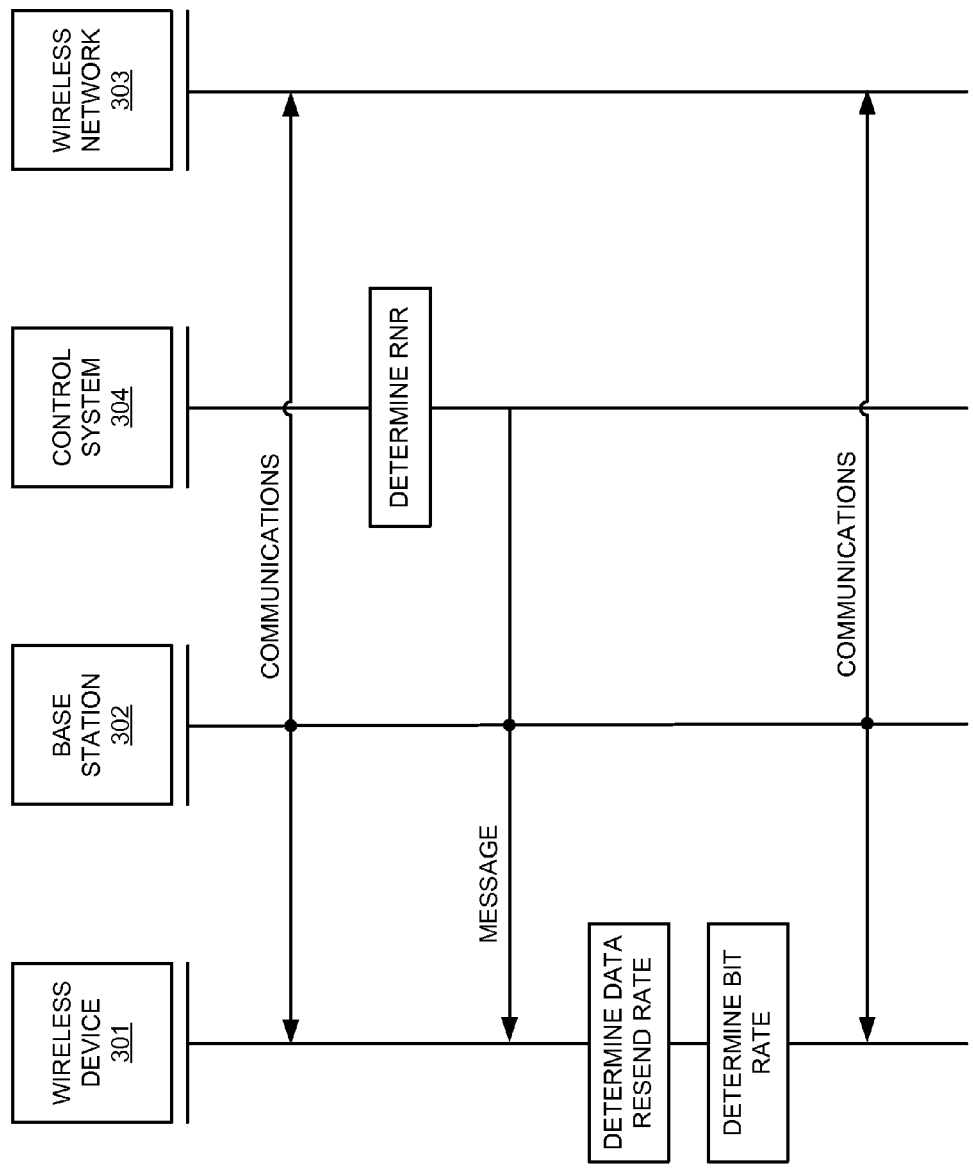
FIG. 4 illustrates the operation of a wireless communication system.

FIG. 4 is a sequence diagram illustrating the operation of wireless communication system 300. The operation begins with wireless device 301 exchanging data communications with wireless network 303 via base station 302. Data communications from wireless device 301 are transferred at a first bit rate. Control system 303 determines the RNR for base station 302. The RNR is a ratio of the data communication signal received by base station 302 from wireless device 301 to the noise that is also received by base station 302.

After determining the RNR, the control system generates and transfers a message indicating the RNR to wireless device 301. The message may be transferred as a text message, a control message, or any other type of message that can be transferred via base station 302 to wireless device 301. In response to receiving the message, wireless device 301 determines a data resend rate for wireless device 301. Alternatively, wireless device 301 may continually keep track of the data resend rate. The data resend rate is the number of data bits that wireless device 301 must resend due to error in transmission or reception of the bits when the bits were first transferred. The data resend rate may be a number of a set of bits that needed to be resent or may be a number of bit over time that needed to be resent.

Wireless device 301 then determines a second bit rate to use when transferring data communications. The bit rate determination is based on the RNR and the data resend rate. Generally, lower RNRs and higher data resend rates call for the bit rate to be lower because lower bit rates tend to increase the likelihood that sent data can be correctly received above the noise level, thus lowering the data resend rate Likewise, higher RNRs and lower data resend rates allow for higher bit rates because less noise increases the likelihood that sent data can be correctly received above the noise level at higher bit rates, thus still allowing for lower data resend rates.

After determining the second bit rate, wireless device 301 transfers data communications to base station 302 using the second bit rate. Wireless device 301 may continue to receive RNR updates from control system 303 and may continue to determine the current data resend rate. This may allow wireless device 301 to continue to adjust the data transfer bit rate as the RNR and data resend rate change.

Figure 5:
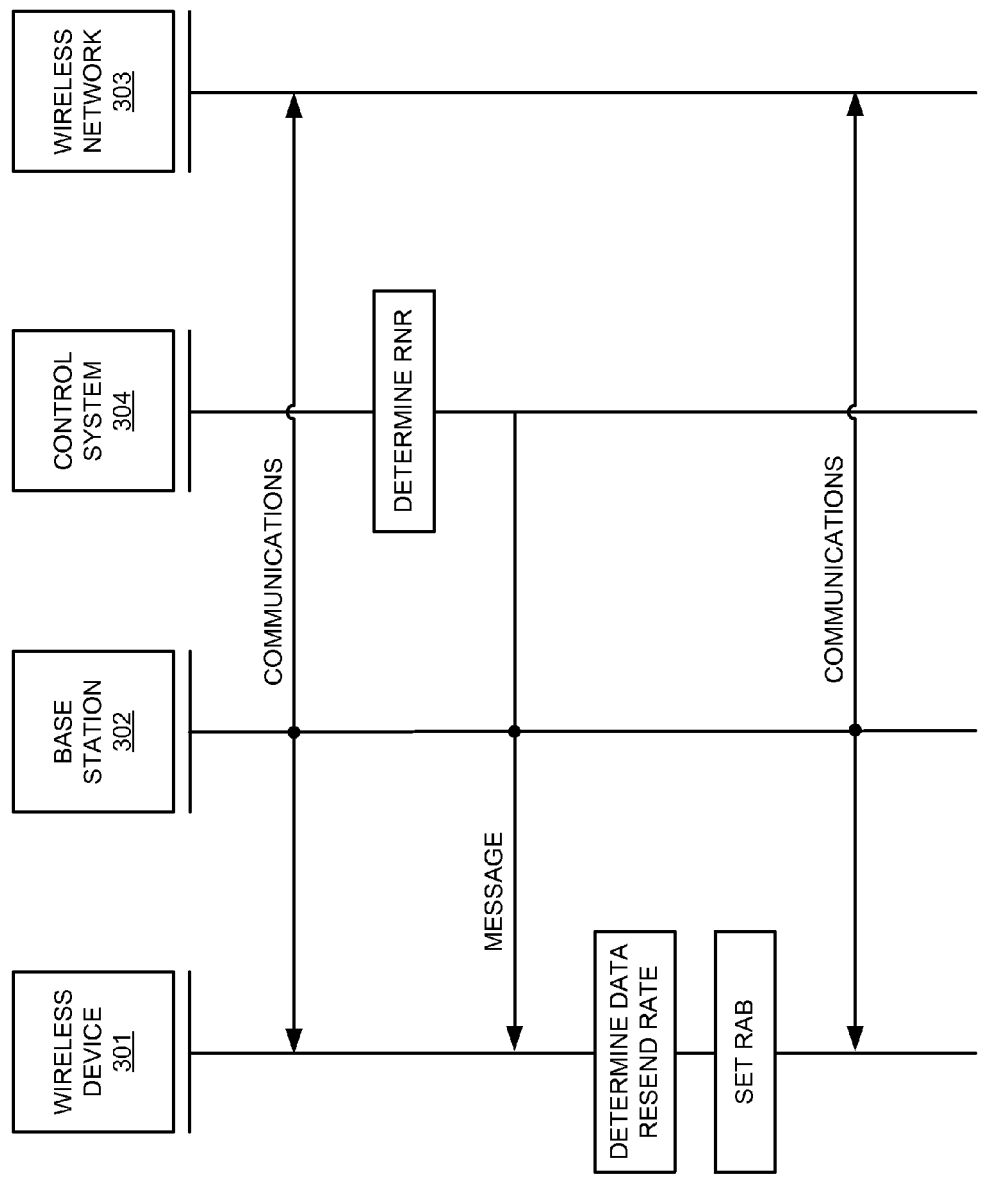
FIG. 5 illustrates the operation of a wireless communication system.

FIG. 5 is a sequence diagram illustrating the operation of wireless communication system 300. The operation begins with wireless device 301 exchanging data communications with wireless network 303 via base station 302. Data communications from wireless device 301 are transferred at a first bit rate. Control system 303 determines the RNR for base station 302. The RNR is a ratio of the data communication signal received by base station 302 from wireless device 301 to the noise that is also received by base station 302.

After determining the RNR, the control system generates and transfers a message indicating the RNR to wireless device 301. The message may be transferred as a text message, a control message, or any other type of message that can be transferred via base station 302 to wireless device 301. In response to receiving the message, wireless device 301 determines a data resend rate for wireless device 301. Alternatively, wireless device 301 may continually keep track of the data resend rate. The data resend rate is the number of data bits that wireless device 301 must resend due to error in transmission or reception of the bits when the bits were first transferred. The data resend rate may be a number of a set of bits that needed to be resent or may be a number of bit over time that needed to be resent.

Wireless device 301 then sets a reverse activity bit (RAB). The RAB is set based on the RNR and the data resend rate. The states of the RAB may be high and low states that are commonly referred to as 1s and 0s in digital processing. The RAB may be set by referencing a data structure, processing the RNR and data resend rate with an algorithm, or any other way to set the RAB based on the RNR and data resend rate. Before sending data, wireless device checks the RAB then transfers the data communications to base station 302 at the bit rate that corresponds to the state of the RAB. Wireless device 301 may continue to receive RNR updates from control system 303 and may continue to determine the current data resend rate. This may allow wireless device 301 to continue to adjust the state of the RAB as the RNR and data resend rate changes.

Figure 6:
FIG. 6 illustrates a reverse activity bit state table.

FIG. 6 illustrates a RAB state table 600 in an example of how wireless device 301 would determine a state of the RAB in FIG. 5. The information provided by table 600 may be contained in other types of data structures and take different forms.

The first column of table 600 displays RNR percentages as related to a threshold RNR value. The RNR is lower as the percentages get higher and closer to the threshold value. Alternatively, the RNR data may be actual RNR values or thresholds rather than percentages. The second column of table 600 displays data resend rate values also as percentages. Alternatively, the second column may show the data resend rate in units other than percentages. The third column of table 600 displays the state of the RAB that corresponds to the RNR value and data resend rate value from the previous two columns. The RAB states of 1 and 0 signify that one of two different bit rates should be used with one bit rate being higher than the other. For example, 1 may correspond to a bit rate of 1 Mbps while 0 may correspond to 2 Mbps.

In an example, wireless device 301 receives a RNR from base station 302 that wireless device 301 determines to be at 74% of the threshold value. Wireless device 301 also determines that the data resend rate of wireless device 301 is 38%. Based on table 600, the RAB is set to 1 because the RNR is greater than 70% and the data resend rate is greater than 20%. Then, before transferring data communications to base station 302, wireless device 301 checks the RAB to find that the RAB is set to 1. The RAB state of 1 instructs wireless device 301 to transfer data at the lower bit rate of 1 Mbps. A lower bit rate is desirable because lower bit rates typically allow for fewer transfer errors, especially in higher noise situations. Fewer transfer errors will reduce the data resend rate.

In an alternative example wireless device 301 receives a RNR from base station 302 that wireless device 301 determines to be at 62% of the threshold value. Wireless device 301 also determines that the data resend rate of wireless device 301 is 15%. Based on table 600, the RAB is set to 0 because the RNR is greater than 60% and the data resend rate is less than 30%. Then, before transferring data communications to base station 302, wireless device 301 checks the RAB to find that the RAB is set to 0. The RAB state of 0 instructs wireless device 301 to transfer data at the higher bit rate of 2 Mbps. A higher bit rate is desirable because the RNR and data resend rate are low enough that faster transference of data may be possible without undue transfer errors.

The above examples may continue to receive RNR updates from base station 302 and continue to monitor the data resend rate in order to update the RAB state based on future conditions. While updating the RAB In some embodiments the RAB may actually comprise multiple bits that correspond to multiple bit rates. For example, the RAB may comprise two bits with the following states: 00, 01, 10, and 11. Each of the states may be associated with a different bit rate, such as 500 kbps, 1 Mbps, 1.5 Mbps, and 2 Mbps, respectively. Thus, the bit rate may be adjusted with more specificity based on the RNR and data resend rate conditions.

Figure 7:
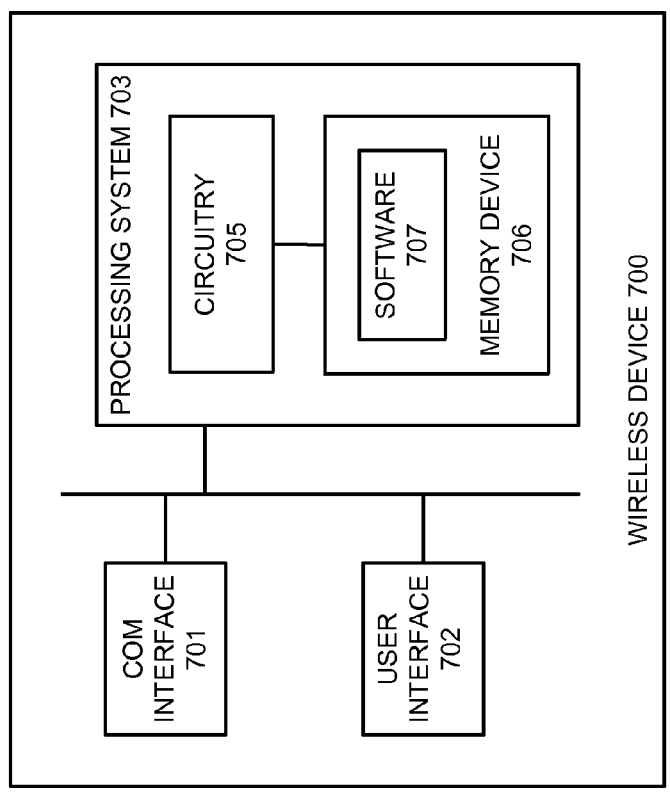
FIG. 7 illustrates a wireless communication device.

FIG. 7 illustrates wireless communication device 700. Wireless communication device 700 is an example of wireless communication device 101, although device 101 could use alternative configurations. Wireless communication device 700 comprises wireless communication interface 701, user interface 702, and processing system 703. Processing system 703 is linked to wireless communication interface 701 and user interface 702. Processing system 703 includes processing circuitry 705 and memory device 706 that stores operating software 707. Wireless communication device 701 may include other well-known components such as a battery and enclosure that are not shown for clarity. Wireless communication device 701 may be a telephone, computer, e-book, mobile Internet appliance, media player, game console, wireless network interface card, or some other wireless communication apparatus—including combinations thereof.

Wireless communication interface 701 comprises RF communication circuitry and an antenna. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols, such as CDMA, EVDO, WIMAX, GSM, LTE, WIFI, HSPA, or some other wireless communication format.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may omitted in some examples.

Processing circuitry 705 comprises microprocessor and other circuitry that retrieves and executes operating software 707 from memory device 706. Memory device 706 comprises a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 may include an operating system, utilities, drivers, network interfaces, applications, or some other type of software. When executed by processing circuitry 705, operating software 707 directs processing system 703 to operate wireless communication device 700 as described herein.

In particular, operating software 707 directs processing system 703 to receive a message indicating an RNR of an access node via communication interface 701 and process the message to modify a data transfer rate of wireless communications from the wireless device based on the RNR indicated by the message. In some embodiments, processing system 703 also determines a data resend rate for the wireless device and modifies the data transfer rate based also on the data resend rate.

Figure 8:
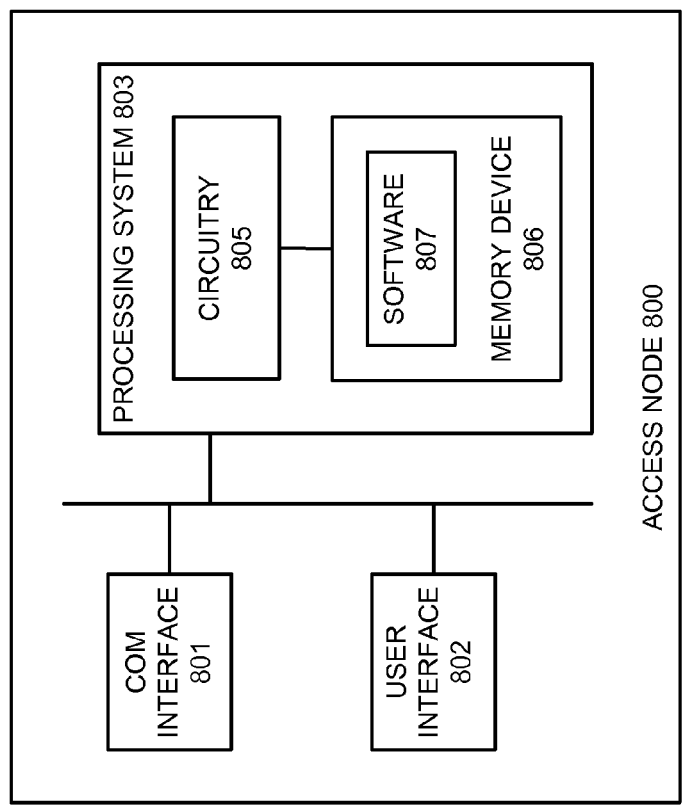
FIG. 8 illustrates a communication control system.

FIG. 8 illustrates communication access node 800. Access node 800 is an example of communication access node 102, although access node 102 may use alternative configurations. Access node 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a disk drive, flash drive, data storage circuitry, or some other memory apparatus. Operating software 807 comprises computer programs, firmware, or some other form of machine-readable processing instructions. Operating software 807 may include an operating system, utilities, drivers, network interfaces, applications, or some other type of software. When executed by circuitry 805, operating software 807 directs processing system 803 to operate access node 800 as described herein.

In particular, operating software 807 directs processing system 803 to exchange wireless communications with a wireless device via communication interface 801. Processing system 803 determines a reverse noise ratio for access node 800 then generates and transfers a message indicating the reverse noise ratio to the wireless device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system comprising:
    exchanging wireless communications between a wireless device and an access node on a wireless communication network;
    determining a reverse noise ratio for the access node;
    generating a message indicating the reverse noise ratio and transferring the message to the wireless device;
    receiving the message in the wireless device and modifying a data transfer rate of the wireless communications from the wireless device based on the reverse noise ratio indicated by the message.

2. The method of claim 1 further comprising, determining a data resend rate for the wireless device and wherein modifying the data transfer rate is further based on the data resend rate.

3. The method of claim 2 wherein modifying the data transfer rate based on the reverse noise ratio and data resend rate comprises determining a state for a reverse activity bit based on the reverse noise ratio and data resend rate, then modifying the data transfer rate based on the state of the reverse activity bit.

4. The method of claim 3 wherein the possible states of the reverse activity bit comprise a high state and a low state and wherein modifying the data transfer rate based on the state of the reverse activity bit comprises setting the data transfer rate to a first rate if the reverse activity bit is in the high state.

5. The method of claim 4 wherein setting the state of the reverse activity bit comprises referencing a data structure comprising a plurality of noise threshold values, resend threshold values, and a state of the reverse activity bit corresponding to each combination of noise threshold values and resend threshold values.

6. The method of claim 5 wherein the data structure indicates that the reverse activity bit is set to a high state if the reverse noise ratio is above a noise threshold value and the resend rate is above a resend threshold value.

7. The method of claim 5 wherein the data structure indicates that the reverse activity bit is set to low state if the reverse noise ratio is below a noise threshold value and the resend rate is below a resend threshold value.

8. The method of claim 5 wherein the data structure indicates that the reverse activity bit is set to high state if the reverse noise ratio is below a noise threshold value and the resend rate is above a resend threshold value.

9. The method of claim 8 wherein modifying the data transfer rate based on the state of the reverse activity bit comprises setting the data transfer rate to a second rate that is higher than the first rate if the reverse activity bit is in the low state.

10. The method of claim 5 wherein the data structure indicates that the reverse activity bit is set to low state if the reverse noise ratio is above a noise threshold value and the resend rate is below a resend threshold value.

11. A wireless communication system comprising:
    a wireless device configured to exchange wireless communication with an access node on a wireless communication network;
    the access node configured to determine a reverse noise ratio for the access node and generate a message indicating the reverse noise ratio and transferring the message to the wireless device;

the wireless device further configured to receive the message and modify a data transfer rate of the wireless communications from the wireless device based on the reverse noise ratio indicated by the message.

12. The wireless communication system of claim 11 wherein the wireless device is further configured to determine a data resend rate for the wireless device and modify the data transfer rate based on the data resend rate in addition to the reverse noise ratio.

13. The wireless communication system of claim 12 wherein the wireless device is configured to modify the data transfer rate based on the reverse noise ratio and data resend rate by determining a state for a reverse activity bit based on the reverse noise ratio and data resend rate, then modifying the data transfer rate based on the state of the reverse activity bit.

14. The wireless communication system of claim 13 wherein the possible states of the reverse activity bit comprise a high state and a low state and wherein modifying the data transfer rate based on the state of the reverse activity bit comprises setting the data transfer rate to a first rate if the reverse activity bit is in the high state.

15. The wireless communication system of claim 14 wherein the wireless device is configured to set the state of the reverse activity bit by referencing a data structure comprising a plurality of noise threshold values, resend threshold values, and a state of the reverse activity bit corresponding to each combination of noise threshold values and resend threshold values.

16. The wireless communication system of claim 15 wherein the data structure indicates that the reverse activity bit is set to a high state if the reverse noise ratio is above a noise threshold value and the resend rate is above a resend threshold value.

17. The wireless communication system of claim 15 wherein the data structure indicates that the reverse activity bit is set to low state if the reverse noise ratio is below a noise threshold value and the resend rate is below a resend threshold value.

18. The wireless communication system of claim 15 wherein the data structure indicates that the reverse activity bit is set to high state if the reverse noise ratio is below a noise threshold value and the resend rate is above a resend threshold value.

19. The wireless communication system of claim 18 wherein modifying the data transfer rate based on the state of the reverse activity bit comprises setting the data transfer rate to a second rate that is higher than the first rate if the reverse activity bit is in the low state.

20. The wireless communication system of claim 15 wherein the data structure indicates that the reverse activity bit is set to low state if the reverse noise ratio is above a noise threshold value and the resend rate is below a resend threshold value.

* * * * *